United States Patent [19]

Perrone et al.

[11] 4,401,573

[45] Aug. 30, 1983

[54] CONTINUOUS PROCESS FOR THE REMOVAL OF CHROMIUM FROM WASTE WATERS AND VALORIZATION OF THE RECOVERED CHROMIUM

[75] Inventors: Diego Perrone; Alberto Patrone, both of Cogoleto; Elvio Caffarelli, Genoa, all of Italy

[73] Assignee: Luigi Stoppani S.p.A., Milan, Italy

[21] Appl. No.: 261,885

[22] Filed: May 8, 1981

[30] Foreign Application Priority Data

May 12, 1980 [IT] Italy ................................. 21975 A/80

[51] Int. Cl.$^3$ ................................................ C02F 1/54
[52] U.S. Cl. ..................................... 210/724; 210/737; 210/913; 423/55
[58] Field of Search ............... 210/702, 710, 711, 720, 210/723, 724, 725, 727, 729, 737, 913; 423/55, 423/58

[56] References Cited

U.S. PATENT DOCUMENTS

| | | | |
|---|---|---|---|
| 3,869,386 | 3/1975 | Izdebski | 210/913 |
| 3,950,131 | 4/1976 | Young | 423/55 |
| 3,969,246 | 7/1976 | Feltz et al. | 210/913 |
| 4,204,973 | 5/1980 | Feltz et al. | 210/913 |
| 4,260,491 | 4/1981 | Cassidy et al. | 210/913 |
| 4,338,200 | 7/1982 | Zeijlstra | 210/913 |

FOREIGN PATENT DOCUMENTS 2630544  8/1977  Fed. Rep. of Germany ...... 210/913

*Primary Examiner*—Peter A. Hruskoci
*Attorney, Agent, or Firm*—Fleit, Jacobson & Cohn

[57] ABSTRACT

A continuous process is described, wherein chromium-containing waste waters are subjected to continuous hot treatment with acetic acid or with alkaline acetates and alkaline hydroxides at a temperature from 40° C. to boiling point and at atmospheric pressure, at a pH higher than 6.5, preferably between 7 and 10, particularly about 7.5. Thus, a "sandy" type of chromium hydroxide is obtained, having a titer in $Cr_2O_3$ of 20 to 40% by weight, which quickly filters, is easily soluble in acids, and thereby affords an easy valorization both as a tanning agent and as a raw material for preparing other chromium compound.

12 Claims, No Drawings

CONTINUOUS PROCESS FOR THE REMOVAL OF CHROMIUM FROM WASTE WATERS AND VALORIZATION OF THE RECOVERED CHROMIUM

This invention relates to a continuous process for the removal of chromium contained in waste waters, using it for valorising the same in that it is recycled to the process itself or it is directed to the production of other chromium compounds.

The problem of removing chromium from the processing waste waters, particularly from metallurgical processings, or tanneries, or processings of organic products using bichromate is well known. This problem presents several aspects: it is of essential importance from the ecological standpoint owing to toxicity of chromium even in small amounts; it is of considerable economical importance owing to the value of the discarded product; and at the same time its recovery involves technological difficulties, particularly for the difficult filtrability of the precipitate of trivalent chromium hydroxide, which is generally obtained.

Therefore, many researches have been carried out and realisations proposed in this field.

Chromium content in waste waters is about 1% (as $Cr_2O_3$) in waters from tanneries, while even higher percentages are found in the residues of oxidation of organic material operations by bichromates.

Processes of recovery of trivalent chromium with alkaline agents of various nature are well known from the literature.

At a handicraftsman level, chromium is removed from the diluted chromium containing solutions by precipitation of chromium hydroxide by means of various alkaline agents, such as calcium oxide, sodium carbonate and bicarbonate, magnesium oxide and the like.

However, the slurries thus obtained which always have a low percentage content of solids, lead to filtering cakes having a high content of hydration water and accordingly being relatively poor in chromium, and of such a structure as to require long separation times.

Precipitation systems by the above mentioned alkaline agents have been the research object of an extensive study of J. C. de Wijs (see "Das Leder" (The Leather) 28 (1977) 1, pages 1-8) "Precipitation and reuse of trivalent chromium present in the tannery waste waters," in order to set up a simple and economical process for the recovery of such chromium residues and removing the same from the waters.

It has been found that the precipitation carried out with magnesium oxide leads to a chromium hydroxide higher in chromium content and having the best settling characteristics. Settling or sedimentation rates of 250 mm/hour are achieved and wet precipitates at about 10% chromium oxide ($Cr_2O_3$) are obtained. The preferred pH for the precipitation of $Cr_2O_3$ from the liquids to be treated is about 9 and it allows an almost quantitative precipitation of chromium without formation of chromites.

However, this process requires unduly long operation times, for example, 3 hours for the treatment of 300 liters of tannery waste liquid with an excess of 30% MgO over the theoretical value and an overnight settling, this leading to a filtered liquid containing 4.6 mg/l chromium.

Another recent proposal for the depuration of chromium-containing waste waters from tannery is described in the U.S. Pat. No. 3,950,131, issued Apr. 13, 1976 to H. H. Young, where an "automatic continuous process for regenerating chromium hydroxide from chromium containing liquids and the chromium recycle to tanning" is claimed.

The removal of chromium up to 1 mg/l Cr is obtained and the necessity of continuous analyses, as generally occurs, is failing.

The precipitation is carried out with alkaline agents (preferably sodium or ammonium hydroxides) in such an amount to raise the pH of the chromium containing solutions to at least 8.0–9.5, so as to obtain a *tixotropic* suspension of precipitated chromium hydroxide. The consistency of the suspension, thus obtained, inhibits the use of common press or vacuum filters, where it would accumulate making the filtering operation unduly long. Therefore, one has recourse to a particular multi-segment filter, on which a pressure higher than about 80 psi (about 5.62 kg/sq.cm) is exerted. Under continous stirring, the cake gradually passes on these segments and thickens. Thus, water is removed to obtain a cake containing 14–15% chromium hydroxide; the latter is discharged and acidified to solve it and to set it to the degree of basicity apt to the recycle to tanning.

Evidently, this process does not yet solve in this way the problem of filterability. A final cake containing up to 15% $Cr(OH)_3$, corresponding to about 10% $Cr_2O_3$ is so obtained; the times required are still unduly long; filtering is bound to the use of a specific filter, which makes very troublesome the filtering operation, requires pressures higher than 80 psi and is accordingly expensive. Moreover, the operation requires highly diluted solutions and long times of decantation (see Table 1 of said patent). The treated and filtered liquid contains 0.2–1.6 mg/l Cr. The only foreseen outlet for the recovered chromium is a recycle to tannery.

In the course of researches made to obviate the disadvantages pointed out above and to enable an improved utilization of the recovered chromium, it was surprisingly discovered that by adding—either preliminary or at the precipitation stage—to the liquid containing the chromium to be precipitated a suitable amount of acetic ion $CH_3CO_2{}^-$, from acetic acid and derivatives thereof, such as acetates, particularly alkaline acetates, chromium hydroxide precipitates are obtained which, maintaining the best physical characteristics, are distinguished by the highest solubility in mineral acids.

This offers the great advantage of allowing an easy preparation, from this chromium hydroxide of other highly pure chromium compounds or also of chromium tanning products of desired basicity.

At the present state of the research, such a phenomenon has not yet been sufficiently explained.

However, it was found that some parameters characterizing the reaction conditions, such as $Cr_2O_3$, concentration, pH and percentage of $CH_3CO_2{}^-$, ion temperature, and staying time in the reactor, would contribute to give rise to it. Particularly, as regards the concentration of the acetic acid to be introduced into the solution to be treated, such a concentration may vary from 0.3% by weight and over, within limits of process economicity.

It was also observed that the ratio between the concentrations of $CH_3CO_2{}^-$ and $Cr_2O_3$, which allows to realize the present invention, is not a constant, but a function of the concentration of the liquid to be treated. For example, for initial concentrations in the order of 1% $Cr_2O_3$, the percentage of acetic ion required to obtain a soluble precipitate is higher. However, it was observed that, if the solution pretreated with acetic ion is allowed to age for some time, the percentage of acetic ion required for such a purpose will decrease.

The primary object of the present invention is therefore to provide a continuous hot process to recovery, under a valuable form, the chromium present in waste liquids, particularly tannery waters, which process allows to obtain a complete and quick precipitation of the chromium hydroxide, while obtaining a chromium hydroxide very highly soluble in acids.

The present invention also relates to the acid soluble chromium hydroxide precipitate, thus obtained.

The method according to the present invention is essentially carried out in two stages:

1. Pretreatment of waste waters with acetic acid or alkaline acetates; and
2. continuous hot precipitation by alkaline hydroxides, at atmospheric pressure, of chromium hydroxide in a quite filterable form, which may be termed as "sandy" for distinguishing it from the tixotropic gelatinous form obtained in the above mentioned patent, and which is soluble in acids. The precipitate thus obtained is easily separable on an ordinary filter, such as a press filter or a vacuum filter and has a content of 40% $Cr_2O_3$, while the discharged waters have a content lower than 2 mg/l Cr.

The process can also be carried out in a single stage by adding the $CH_3CO_2^-$ ion during the precipitation with alkali.

Owing to its high solubility in acids, also in weak acids, such a precipitate distinguishes it self from those obtained by hitherto known processes, accordingly allowing to directly obtain chromium tanning liquids of desired basicity and titer, quite similar to the tanning materials available on the market, or chromium salts for different purposes.

Generally, alkaline hydroxides (sodium, potassium, ammonium) as well as magnesium oxide may be used as precipitating agents.

The process of the present invention is carried out in a reactor, maintained at a temperature in the range from 40° C. to boiling point at atmospheric pressure, by continously introducing the waste waters (such as tannery waste waters) containing from 0.1% (1000 ppm) to about 10% of $Cr_2O_3$, and an alkaline hydroxide, preferably sodium or potassium hydroxide, and automatically setting the liquid flow rate, so as to establish in the reaction medium a pH not lower than 6.5, preferably between 7 and 10, and more particularly about 7.5. Thus, a precipitate of $Cr(OH)_3$ is obtained in a (sandy) form, which immediately and completely filters on any ordinary filter. This analytical content of $Cr_2O_3$ ranges between 40 and 43% related to the wet cake.

Unlike the cakes obtained by known methods, the so obtained cake is perfectly soluble in acids (higher than 99%).

The obtained solution, adjusting with sulphuric acid the basicity as desired (33-50 Sch), may be intended for tannery.

Otherwise, the washed cake may be supplied to the preparation of other chromium salts.

Finally, the chromium hydroxide can be also calcined to chromium oxide for metallurgical purpose.

It should be pointed out that the pre-treatment with acetic acid could also take place within the reactor.

The process according to the present invention is continuously carried out and on industrial base, an-d—by allowing the removal of chromium below 2 mg/l from the waste waters containing the same—also solves the ecological problem of the disposal of these liquids.

For a better illustration of the foregoing description, some examples will now be given, examples which should be considered only as illustrative and unrestrictive of the present invention.

EXAMPLE 1

Continuous hot precipitation of chromium hydroxide, its filterability and cake solubility A solution, prepared in laboratory for comparison, containing 5.27% $Cr_2O_3$, was continously treated with 25% sodium hydrate at 95° C. up to pH 7.6 in reactor having a useful volume of 7 liters, at atmospheric pressure, by automatically setting the flow rate of the liquid to be treated or of the precipitating agent to allow an average reaction time of about 60 minutes.

Thus, a slurry containing precipitated chromium hydroxide was obtained, having such filterability characteristics as to enable filtering on buckner ($\phi=150$ mm) of 4 kg of slurry in less than 1 minute, at a vacuum of 300 mm Hg, using a paper disc as filter.

The analysis of the obtained cake gave:
$Cr_2O_3\% = 33.38$ on wet cake
$H_2O\% = 43.0$ on the cake at 110° C.
$Cr_2O_3\% = 58.56$ on dry at 110° C.

100 g of this wet cake were treated for 3 hours at the boiling point with such an amount (44 g) of commercial 98% $H_2SO_4$ to obtain a solution of a tanning material having a basicity of 33 Sch and 113 g water.

About 30 g solid remain undissolved in the final slurry, so that the yield of the final dissolution corresponds to about 70% and the solution obtained is not suitable for use as a tanning material.

EXAMPLE 2

Processing of waste waters by preliminary treatment with acetic acid according to the invention A waste liquid containing in solution 5.27% by weight $Cr_2O_3$ was added with 80% acetic acid to obtain a 3.30% by weight solution; then the chromium hydroxide was precipitated from the same in a 7 liter reactor, maintained under stirring, at 95° C. at a constant pH of 7.8, with 25% sodium hydrate, adjusting the flow rate to have an average reaction time of 60 minutes.

After filtering on buckner, the characteristics of the obtained chromium hydroxide were as follows:
$Cr_2O_3$ by weight = 41.52 on wet cake
$H_2O\%$ by weight = 29.0 on wet cake
$Cr_2O_3\%$ by weight = 58.47 on dry cake This cake was then treated with 98% $H_2SO_4$ and water in the following ratios:
cake = 400 g
98% $H_2SO_4$ = 172 g
$H_2O$ = 649 g in less than 40 minutes, at the boiling temperature; a tanning liquid was so obtained having the following characteristics:
$Cr_2O_3\%$ by weight = 14.17
$SO_3\%$ by weight = 11.58
$CH_3COOH\%$ by weight = 0.26
$Na_2SO_4\%$ by weight = 2.90
Sch = 48.2

Any insoluble residue is absent, that is the dissolution yield is higher than 99%.

EXAMPLE 3

Waste water processing by pretreatment with acetic acid according to the invention From a liquid, containing 1% $Cr_2O_3$ by weight and 0.6% $CH_3COOH$ by weight, treated under the conditions of Example 2, at 80° C., a cake of chromium hydroxide having the following characteristics was obtained:

$Cr_2O_3$ by weight=23,23 on wet cake
$H_2O$% by weight=61.50 on wet cake
$Cr_2O_3$% by weight=60.34 on dry cake to 110° C.

This cake, treated with the stoichiometrical amount of conc. sulphuric acid and with an amount of water to lead to a titer of 13.5% in $Cr_2O_3$ provided within a time less than 60 minutes a tanning liquid with a basicity of 35 Sch. In this case, the dissolution yield was higher than 99%.

From the foregoing the considerable advantages of the process according to the present invention over the prior art are readily apparent, which advantages being essentially summarized as follows:

possibility of directly using waste waters even much diluted (0.1%);

easiness and rapidity of a separation and isolation of the chromium hydroxide in an easily filterable form and provision of a precipitate perfectly soluble in acids;

processing at atmospheric pressure;

short working times;

saving in overall size, machinery and labor power saving in filtering;

high percentage of the waste chromium recovered (higher than 99.9%).

chromium recovery for recycle to tanning operation; and chromium recovery in the form of a valuable chromium compound.

What we claim is:

1. A process for removing $Cr_2O_3$ from waste waters comprising the steps of:
   pretreating the waste water with at least 0.3% by weight acetic acid or acetate ion, and
   adding an alkaline material selected from the group consisting of sodium hydroxide, potassium hydroxide, ammonium hydroxide and magnesium oxide continuously to the pretreated waste waters at a temperature of between 40° C. and the boiling point, at atmospheric pressure, wherein the pH is maintained above 6.5,
   wherein a sandy precipitate of chromium hydroxide is obtained which is separated from the waste water by filtering.

2. A process for the removal of chromium from waste waters according to claim 1, wherein the alkaline hydroxide for the precipitation are selected among sodium hydroxide, potassium hydroxide and ammonium hydroxide.

3. A process for the removal of chromium from waste waters, according to claim 1 or 2, wherein the pH is set to a value between 7 and 10.

4. A process for the removal of chromium from waste waters, according to claim 3, wherein the pH is 7.5.

5. A process for the removal of chromium from waste waters, according to claim 4, wherein the chromium hydroxide precipitate has a content of $Cr_2O_3$ in the range of 20–40%.

6. A process according to claim 5, wherein the $CH_3CO_2^-$ ion is introduced during the precipitation step of chromium hydroxide with alkali.

7. A process for the removal of chromium from waste waters wherein the chromium is present in the trivalent state, comprising the steps of:
   treating waste waters, containing from about 0.1% to about 10% $Cr_2O_3$, with at least 0.3% weight acetic acid or $CH_3CO^-_2$;
   adding an alkaline material, selected from the group consisting of sodium hydroxide, potassium hydroxide, ammonium hydroxide and magnesium oxide continuously at a temperature of from 40° C. to about 100° C., at atmospheric pressure, wherein the pH of the waste water is maintained above 6.5,
   wherein the pH of the medium of reaction is set by automatically setting a flow rate of the waste water, and
   wherein a sandy precipitate of chromium hydroxide is obtained which is separated from the waste water by filtering.

8. A process according to claim 7, wherein the $CH_3CO^-_2$ ion is introduced together with the alkaline hydroxides.

9. A process for the removal of chromium from waste waters, according to claim 7 or 8, wherein the pH of the medium is 7.5.

10. A process for the removal of chromium from waste waters, according to claim 7 or 8, wherein the chromium hydroxide has a content of $Cr_2O_3$ in the range of 20 to 43% by weight.

11. A process according to claim 7, wherein waste water containing 5.27% by weight $Cr_2O_3$ is treated by the steps of:
    adding 80% acetic acid to obtain a 3.3% by weight solution acetic acid;
    stirring the waste water at 95° C. at pH 7.8;
    adding 25% sodium hydrate to precipitate chromium hydroxide.

12. A process according to claim 7, wherein waste water containing 1% by weight $Cr_2O_3$ is treated by the steps of:
    adding 80% acetic acid to obtain a 0.6% by weight solution of acetic acid;
    stirring the waste water at 95° C. at pH 7.8;
    adding 25% sodium hydrate to precipitate chromium hydroxide.

* * * * *